United States Patent
Oversluizen et al.

(10) Patent No.: US 8,654,437 B2
(45) Date of Patent: Feb. 18, 2014

(54) APPEARANCE-MODIFYING DEVICE, AND METHOD FOR MANUFACTURING SUCH A DEVICE

(75) Inventors: Gerrit Oversluizen, Eindhoven (NL); Sander Jurgen Roosendaal, Brno (NL); Thomas Caspar Kraan, Eindhoven (NL); Gerard Cnossen, Drachten (NL); Raymond Jean Louis Van Kooyk, Eindhoven (NL); Dirk Kornelis Gerhardus De Boer, Eindhoven (NL); Alwin Rogier Martijn Verschueren, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 246 days.

(21) Appl. No.: 12/996,413

(22) PCT Filed: Jun. 10, 2009

(86) PCT No.: PCT/IB2009/052473
§ 371 (c)(1), (2), (4) Date: Dec. 6, 2010

(87) PCT Pub. No.: WO2009/153711
PCT Pub. Date: Dec. 23, 2009

(65) Prior Publication Data
US 2011/0090556 A1     Apr. 21, 2011

(30) Foreign Application Priority Data
Jun. 17, 2008   (EP) ..................................... 08158380

(51) Int. Cl.
*G02B 26/00* (2006.01)
*G09G 3/34* (2006.01)
*G02F 1/167* (2006.01)

(52) U.S. Cl.
CPC ..................................... *G02F 1/167* (2013.01)
USPC .......................................... 359/296; 345/107

(58) Field of Classification Search
USPC .............. 359/296; 345/107; 430/32; 204/600
See application file for complete search history.

(56) References Cited

U.S. PATENT DOCUMENTS

| 6,259,549 B1 | 7/2001 | Leupolz et al. |
| 2002/0196526 A1 | 12/2002 | Kawai et al. |

(Continued)

FOREIGN PATENT DOCUMENTS

| EP | 1079584 A2 | 2/2001 |
| JP | 2004062052 A | 2/2004 |

(Continued)

OTHER PUBLICATIONS

Hiemenz et al: "Principles of Colloid and Surface Chemistry"; 3rd Edition, Marcel Dekker Inc, 1997, Chapter 12, pp. 534-574.

(Continued)

*Primary Examiner* — William Choi

(57) ABSTRACT

An appearance-modifying device (10; 30), for modifying the visual appearance of a surface covered thereby, comprising: first (11) and second (12) oppositely arranged optically transparent substrates; a spacer structure (13; 32) spacing apart the first (11) and second (12) substrates in such a way that a space between the first (11) and second (12) substrates is divided into a plurality of cells (15, 16; 31*a-c*). The appearance-modifying device further has, in each cell (15, 16; 31*a-c*), an optically transparent fluid (19) having a plurality of particles (20) dispersed therein, the particles being moveable in the fluid (19) through application of an electric field; and first (17*a*, 18*a*; 33) and second (17*b*, 18*b*; 32) electrodes arranged to simultaneously, by application of a voltage across the electrodes, control a distribution of the particles (20) within each of a plurality of the cells (15, 16; 31*a-c*) from a first, dispersed state in which an appearance of the surface covered by the appearance-modifying device is determined by optical properties of the particles (20), to a second state in which the particles (20) are concentrated adjacent to at least one of the first (17*a*, 18*a*; 33) and second (17*b*, 18*b*; 32) electrodes in such a way that the appearance-modifying device (10; 30) becomes optically transparent.

15 Claims, 5 Drawing Sheets

(56) References Cited

U.S. PATENT DOCUMENTS

| | | |
|---|---|---|
| 2003/0214479 A1 | 11/2003 | Matsuda et al. |
| 2004/0160538 A1 | 8/2004 | Li et al. |
| 2004/0189591 A1 | 9/2004 | Breuil |
| 2005/0017943 A1 | 1/2005 | Weisbuch et al. |
| 2006/0038772 A1* | 2/2006 | Amundson et al. ........... 345/107 |
| 2006/0125776 A1* | 6/2006 | Togano et al. ................ 345/107 |
| 2007/0183021 A1 | 8/2007 | Huang |
| 2010/0245981 A1* | 9/2010 | Yeo et al. ...................... 359/296 |

FOREIGN PATENT DOCUMENTS

| | | |
|---|---|---|
| JP | 2007057724 A | 3/2007 |
| WO | 2004095122 A1 | 11/2004 |
| WO | 2006040716 A | 4/2006 |

OTHER PUBLICATIONS

Pohl, H.: "Dielectrophoresis:The Behavior of Neutral Matter in Non-Uniform Electric Fields"; Cambridge University Press, 1978, Chapter 14.

\* cited by examiner

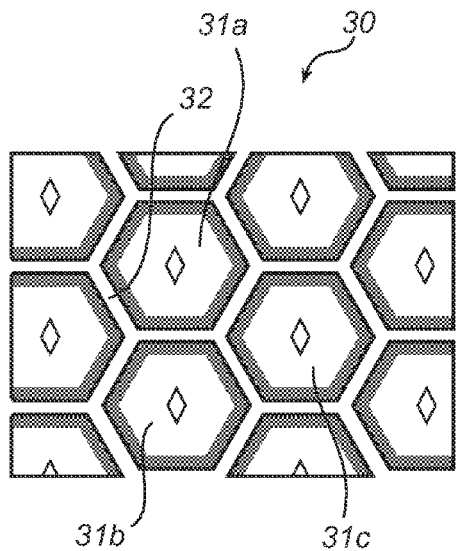
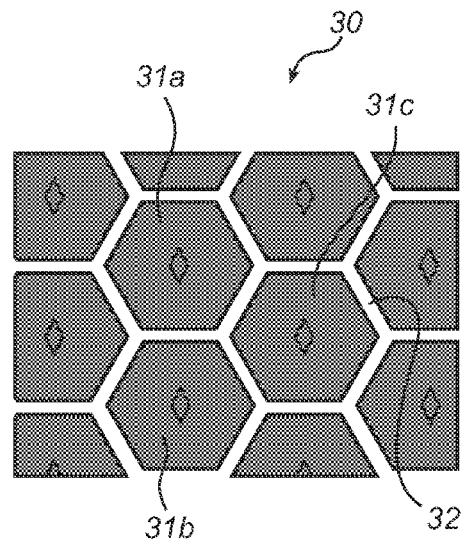
Fig. 4a                    Fig. 4b
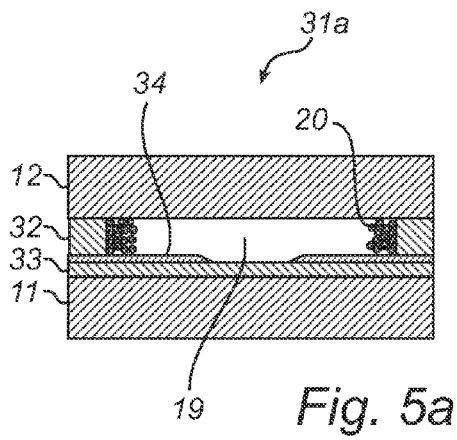
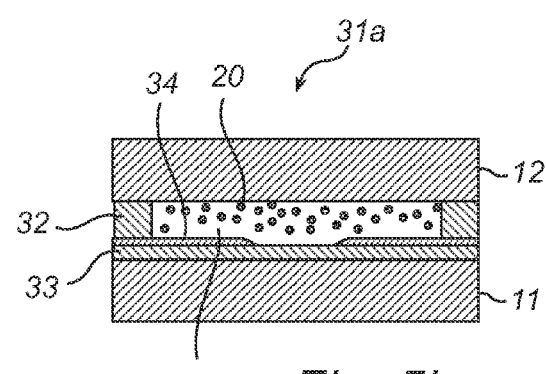
Fig. 5a                    Fig. 5b

APPEARANCE-MODIFYING DEVICE, AND METHOD FOR MANUFACTURING SUCH A DEVICE

FIELD OF THE INVENTION

The present invention relates to an appearance modifying device and to a method for manufacturing such an appearance-modifying device.

BACKGROUND OF THE INVENTION

For many types of products, customizable appearance of the product may be desirable. For example, it may be attractive to be able to customize the appearance of at least a part of a product depending on its current state, to convey information about the current state of the product to a user in an intuitive and attractive way. It may also be perceived as attractive to the user of a product to be able to alter its appearance to reflect the user's personality or mood etc.

According to one well-known example, such customizable appearance of a product is realized by exchangeable "skins" on consumer electronic products, such as mobile telephones. This type of "skins" are typically provided as plastic shells that can be exchanged by the user of the product.

It has also been suggested to use electrically controllable optical properties of an appearance-modifying device covering a surface of a product to alter the appearance of the product.

US 2004/0189591 discloses one example of such an appearance-modifying device in the form of electrophoretic display devices covering control buttons of a programmable remote control unit. Depending on the component to be controlled through the programmable remote control unit, the electrophoretic display devices are adjusted to display the settings relevant to the particular component to be controlled.

The appearance-modifying device disclosed in US 2004/0189591 is provided in the form of microcapsules sandwiched between top and bottom electrode layers. Each microcapsule contains positively charged white pigment chips and negatively charged black pigment chips suspended in a clear suspension medium. By forming a suitable electric field pattern in the appearance-modifying device of US 2004/0189591, a black and white image can be formed, which is thus attributed to the respective button.

Although enabling modification of the appearance of a product, more specifically a programmable remote control, the appearance-modifying device disclosed in US 2004/0189591 is not suitable for every application. In particular, the type of appearance-modifying device described above cannot be used when the surface covered thereby itself conveys information. For example, at least a portion of the surface may be a display that is only sometimes active, but then must be clearly visible to the user of the product.

SUMMARY OF THE INVENTION

In view of the above-mentioned and other drawbacks of the prior art, a general object of the present invention is to provide an improved appearance-modifying device and in particular an appearance-modifying device capable of being switched to a transparent state.

According to a first aspect of the present invention, these and other objects are achieved through an appearance-modifying device, for modifying the visual appearance of a surface covered thereby, comprising first and second oppositely arranged optically transparent substrates; a spacer structure spacing apart the first and second substrates in such a way that a space between the first and second substrates is divided into a plurality of cells; in each cell, an optically transparent fluid having a plurality of particles dispersed therein, the particles being moveable in the fluid through application of an electric field; and first and second electrodes arranged to simultaneously, by application of a voltage across the electrodes, control a distribution of the particles within each of a plurality of the cells from a dispersed state in which an appearance of the surface covered by the appearance-modifying device is determined by optical properties of the particles, to a state in which the particles are concentrated adjacent to one of the first and second electrodes in such a way that the appearance-modifying device becomes optically transparent.

In the present application, "fluid" is understood to be a substance, which alters its shape in response to any force and tends to flow or to conform to the outline of the chamber in which it may be contained. The term "fluid" thus includes gases, liquids, vapors and mixtures of solids and liquids, when these mixtures are capable of flow.

The term "particles" is not limited to solid particles, but also includes liquid droplets and fluid-filled capsules.

Any or both of the first and second transparent substrates may be an optically transparent member, typically sheet-shaped, on which the spacer structure can be formed. Suitable substrate materials include, for example, glass, polycarbonate, polyimide etc.

By an "optically transparent" medium is, in the present context, meant a medium which permits passage of at least a fraction of the light (electromagnetic radiation in the visible spectrum) impinging on it.

The optical properties of the particles should be interpreted as the effect of interaction between the particles and the light impinging on the particles. For example, the particles may partially or essentially completely reflect light, absorb light or scatter light. Each of these effects may be, and typically is, wavelength dependent, whereby colored effects can be achieved.

The present invention is based on the realization that an appearance-modifying device capable of being controlled between a transparent state and an appearance-modifying state can advantageously be achieved using so-called in-plane switching of a transparent electrophoretic device, so that the particles dispersed in the transparent fluid in the cells can be taken from a dispersed state in which the appearance of the covered surface is modified through the properties of the particles, to a state in which the particles are concentrated in the vicinity of one or both of the electrodes. By concentrating the particles at one or both of the electrodes, the area including particles can be greatly reduced and the appearance-modifying device made transparent.

The present inventors have further realized that a high level of transparency of the appearance-modifying device can be achieved by maximizing the fraction of the total area of the appearance-modifying device that can be evacuated from particles, and that this can be achieved by arranging the first and second electrodes in such a way that the particle distribution in a plurality of cells can be simultaneously controlled by applying a voltage across the electrodes.

It is recognized that electrophoretic display devices based on in-plane control of particles dispersed in a liquid are known per se, for example from US 2003/0214479. However, such display devices are not transparent, and, furthermore, each cell is individually controllable to form a display image. Individual control of each cell (pixel) requires additional addressing electrodes. Such additional electrodes generally occupy space between adjacent cells or require an additional electrode layer and also absorb and/or reflect light. Both of these effects limit the fraction of incident light that can pass through the device. Thus, even if technology known from available in-plane electrophoretic display devices were to be used to realize a transparent appearance-modifying device, such an appearance-modifying device would not reach the level of transparency achievable using the appearance-modifying device according to the present invention.

It should be noted that the particles dispersed in the fluid may or may not be charged. For uncharged particles, the particles are caused to move in response to the application of an electric field through dielectrophoresis, which is described in detail in "Dielectrophoresis; the behavior of neutral matter in non-uniform electric fields", by H. A. Pohl, University Press, Cambridge, 1978.

In the case of charged particles, the majority of the particles may advantageously have the same sign charge so as to prevent clustering of oppositely charged particles (electrical neutrality of the fluid is ensured by the presence of ions of opposite charge).

However, it may also be advantageous to provide the particles as a mix of positively and negatively charged particles. When controlling the appearance-modifying device to its transparent state, the particles may then be collected at both electrodes, depending on polarity. This may lead to a more transparent state and more efficient use of the controllable area of each cell.

Furthermore, color control of the appearance-modifying device can be achieved by providing a first set of positively charged particles having a first color and a second set of negatively charged particles having a second color.

The particles may, furthermore, be essentially uniformly distributed in the absence of an electric field. When a field is applied, the particles may be re-distributed. Either the particles move until the field is removed or a state is entered in which there is an equilibrium between the forces exerted on the particles through their own charges (in the case of electrophoresis) or dipoles (in the case of dielectrophoresis) and the applied electric field. For a more detailed description of electrophoresis, the following document is referred to:

"Principles of Colloid and Surface Chemistry", by P. C. Hiemenz and R. Rajagopalan, $3^{rd}$ edition, Marcel Dekker Inc., New York, 1997, pp. 534-574.

To limit the influence of the appearance-modifying device in its optically transparent state and to, at the same time, provide an efficient modification of the appearance of the surface covered thereby, the appearance-modifying device may advantageously be configured in such a way that, for each cell, a ratio between an area controllable by the first and second electrodes between a particle-modified state and a transparent state, and the total area of the cell is greater than 70%.

As is understood by the person skilled in the art, such a ratio is obtainable through various configurations of the appearance-modifying device according to the present invention.

For example, any one or both of the first and second electrodes may be formed by a transparent material, such as ITO (Indium-Tin-Oxide), IZO (Indium-Zinc-Oxide), sufficiently thin metallic electrodes, or similar well-known materials.

Furthermore, increasing the total area of each cell will typically also increase the above-mentioned ratio between the controllable area and the total area. Assuming typical minimum lateral dimensions of the electrodes and the spacer structure to be around 10 to 30 micrometer, which is a reasonable assumption given current manufacturing technologies, the desired ratio of more than 70% is readily obtainable for a total area of each cell greater than 0.01 mm$^2$.

Another factor contributing to enabling a large ratio between the controllable area and the total area of each cell is the number of cells that are simultaneously controllable by the first and second electrodes. By, for example, arranging the first and second electrodes to simultaneously control at least 100 cells, a substantial amount of space is saved that would otherwise have been needed to accommodate further electrodes passing between cells on their way to other cells to be controlled thereby.

In one embodiment of the appearance-modifying device according to the present invention, at least one of the first and second electrodes may be at least partly covered by the spacer structure along a portion of a perimeter of each of the cells controllable by the electrodes.

Hereby, the total area in each cell occupied by the spacer structure and the first and/or second electrode can be reduced due to at least partial sharing of the area in the cell. This contributes to maximizing the ratio between the controllable area and the total area of each cell.

Furthermore, at least partly covering the first and/or second electrode by the spacer structure may enable packing of the particles closer to the walls of the cell, which are constituted by the spacer structure. As a consequence thereof, the ratio between the controllable area and the total area of each cell can be further increased.

According to another embodiment of the appearance-modifying device of the present invention, at least a portion of the spacer structure may be conductive and form the second electrode. Hereby similar advantageous effects are achieved as for the embodiment in which the second electrode is at least partly covered by the spacer structure.

Moreover, the first and second electrodes may be arranged on the first substrate. Hereby, the second substrate can be arranged essentially without alignment, or with only very rough alignment, which facilitates manufacturing of the appearance-modifying device.

Alternatively, the first electrode may be arranged on the first substrate, and the second electrode may be arranged on the second substrate. Although typically requiring a more accurate alignment than in the case when both the first and the second electrode are arranged on the first substrate, a more advantageous configuration of the electric field in the cells can be achieved, whereby a faster switching between the first and second states can be accomplished.

Moreover, the first electrode may be provided as a transparent conductive layer formed on the first substrate and covered by a dielectric layer. Through this configuration, the first electrode can be formed as an unpatterned conductive layer and the second electrode can be formed as a pattern in a subsequent layer without short-circuiting the first and second electrodes.

Furthermore, the dielectric layer may advantageously have a recess formed therein in each cell. The recess should be provided in such a way that the first electrode layer is exposed, or at least only covered by a very thin remaining layer of dielectric, the condition for the thickness of the remaining layer in relation to the cell being given by the following expression:

$$\frac{\text{thickness}_{dielectric\ opening}}{\text{conductivity}_{dielectric}} \ll \frac{\text{radius}_{cell}}{\text{conductivity}_{fluid}} \ll \frac{\text{thickness}_{dielectric}}{\text{conductivity}_{dielectric}}$$

Providing a recess in the dielectric layer in such a way that the above condition is satisfied results in an electric field configuration in the cell, when a voltage is applied between the first and second electrodes, which efficiently concentrates the particles dispersed in the fluid to a first particle concentration site constituted by the recess (typically exposing a portion of the first electrode layer) and/or to a second particle concentration site constituted determined by the configuration of the second electrode. In this way no further control electrodes are needed to concentrate the particles to a small part of each cell, whereby a ratio between a controllable area in each cell and the total area of the cell can be maximized. In addition, the manufacturing is simplified since fewer layers, and accordingly less alignment is needed in comparison to prior art.

By providing a recess in the dielectric layer, the electric field in the cell can be controlled through the position and configuration of the recess as well as through the electric properties (notably the conductivity) of the dielectric layer. By selecting a dielectric layer having a conductivity that is lower than the conductivity of the fluid in the cell, the electric field can be shaped to efficiently direct the particles towards the first particle concentration site constituted by the recess (typically exposing a portion of the first electrode) when a suitable voltage is applied between the first and second electrodes.

With respect to the cell, the most desirable position of the opening in the dielectric depends on the application of the appearance-modifying device. For some applications, it may be advantageous to have the openings centrally located in each cell, while other applications may benefit from off-center locations or a mix of some cells having centrally located openings and other cells having off-center openings.

Moreover, the dielectric layer may have a plurality of recesses formed therein in each cell.

Having a plurality of recesses formed in the dielectric layer in each cell is particularly advantageous in applications where the second electrode is provided on the second substrate. To ensure that the appearance-modifying device becomes optically transparent when a voltage is applied across the electrodes, a lateral component of the electric field in the cell is required. Therefore, the second substrate should advantageously be arranged in such a way that an overlap between the particle concentration location(s) on the first substrate and the particle concentration location(s) on the second substrate is prevented. By particle concentration location should be understood a location where particles concentrate when an appropriate voltage is applied.

To prevent such an overlap, an alignment step is typically required. By providing several openings in the dielectric layer covering the first electrode layer, several particle concentration locations are provided on the first substrate. Hereby, the alignment tolerance is improved.

According to a second aspect of the present invention, the above-mentioned and other objects are achieved by a method for manufacturing an appearance-modifying device, for modifying the visual appearance of a surface covered thereby, comprising the steps of providing a first optically transparent substrate having a first electrode formed thereon; providing a spacer structure to form a plurality of cells on the first substrate in such a way that an area occupied by each cell includes a portion of the first electrode; arranging a second electrode in such a way that the area occupied by each cell includes a portion of the second electrode; providing, in each of the cells, an optically transparent fluid having a plurality of particles dispersed therein; and arranging a second optically transparent substrate to cover the cells.

According to one embodiment, the second electrode may be provided on the second optically transparent substrate and the step of arranging the second substrate comprises the step of aligning the second electrode to the plurality of cells.

Furthermore, the first electrode may be covered by a dielectric layer, and the method may further comprise the step of removing, in an area corresponding to each cell, a portion of the dielectric layer to form a recess therein.

Further embodiments and effects associated with this second aspect of the invention are largely analogous to those provided above for the first aspect of the present invention.

BRIEF DESCRIPTION OF THE DRAWINGS

These and other aspects of the present invention will now be described in more detail, with reference to the appended drawings showing currently preferred embodiments of the invention, wherein:

FIGS. 4*a-b* are top views of an exemplary appearance-modifying device according to another embodiment of the present invention in two different states of the device; and FIGS. 5*a-b* are partial cross-section views of the appearance-modifying device of FIGS. 4*a-b*, respectively.

DESCRIPTION OF A PREFERRED EMBODIMENT OF THE PRESENT INVENTION

The present invention will be mainly described hereinafter with reference to an in-plane electrophoretic appearance-modifying device having the first and second electrodes arranged on the first substrate.

It should be noted that this by no means limits the scope of the invention, which is equally applicable to in-plane electrophoretic appearance-modifying devices having other electrode configurations, such as having the first electrode on the first substrate and the second electrode on the second substrate.

There are a large number of applications for various embodiments of the appearance-modifying device according to the present invention, some of which are schematically illustrated in FIGS. 1*a-g*.

Figure 1A:
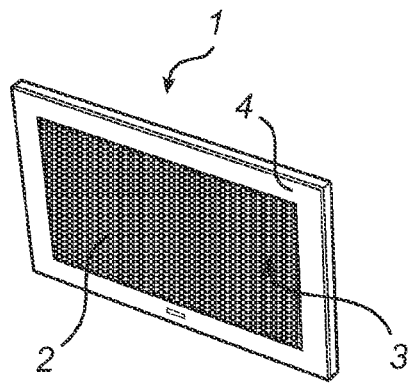
FIGS. 1*a-g* schematically illustrate various applications for embodiments of the appearance-modifying device according to the present invention.
Figure 1B:
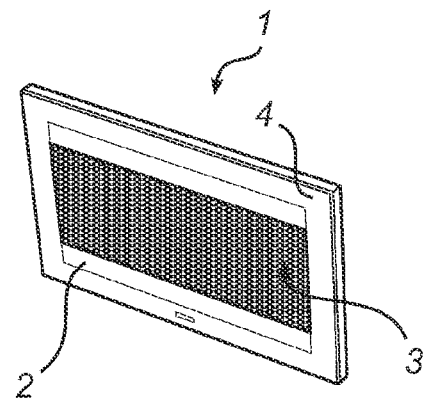
Figure 1C:
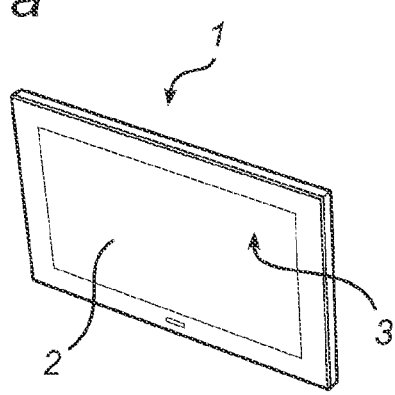

In FIGS. 1*a-c*, a flat screen television device 1 is provided with an appearance-modifying device 2 covering at least the display 3 of the television device 1.

FIG. 1*a* shows the television device 2 in normal, full-screen operation in which the entire display is used for displaying image content, with the appearance-modifying device 2 in its transparent state. Accordingly, the entire display 3 of the television device 1 is visible for a viewer.

FIG. 1*b* shows the television device 1 in wide-screen operation with the appearance-modifying device 2 in a partially transparent state such that a portion of the display 3 has had its appearance modified by the appearance-modifying device 2. In the present example, the appearance-modifying device 2 has modified the portion of the display 3 that is not used to display image content to have essentially the same appearance as the frame 4 surrounding the display 3.

Finally, FIG. 1c shows the television device 1 when turned off, with the appearance-modifying device 2 in a state in which it modifies the entire display 3 to have essentially the same appearance as the frame 4 surrounding the display 3.

Figure 1D:
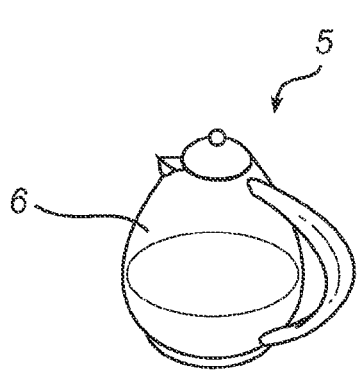
Figure 1E:
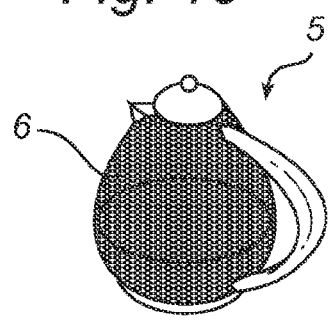

A further application in the form of a water boiler 5 is schematically illustrated in FIGS. 1d-e. By covering the water boiler 5 by an appearance-modifying device 6, the water boiler can be made to visually illustrate to a user in which state it is. For example, the appearance-modifying device 6 can be controlled between a first color, for instance blue, to indicate that the water in the water boiler is cold and a second color, for instance red, to indicate that the water (and thus the water boiler 6) is hot.

Figure 1F:
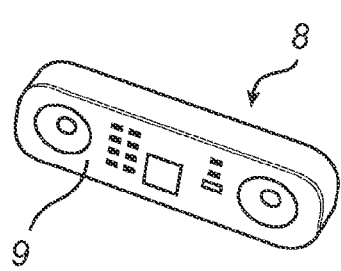
Figure 1G:
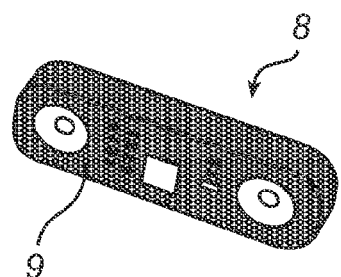

In another application, in the form of the music player 8 in FIGS. 1f-g, the music player 8 can be covered by an appearance-modifying device 9 to enable a user to control the appearance, such as the color, of the music-player according to her/his mood or personal preference.

Having now indicated some of the numerous applications for an appearance-modifying device, an exemplary embodiment of the appearance-modifying device according to the present invention will be described below with reference to FIGS. 2a-b.

Figure 2A:
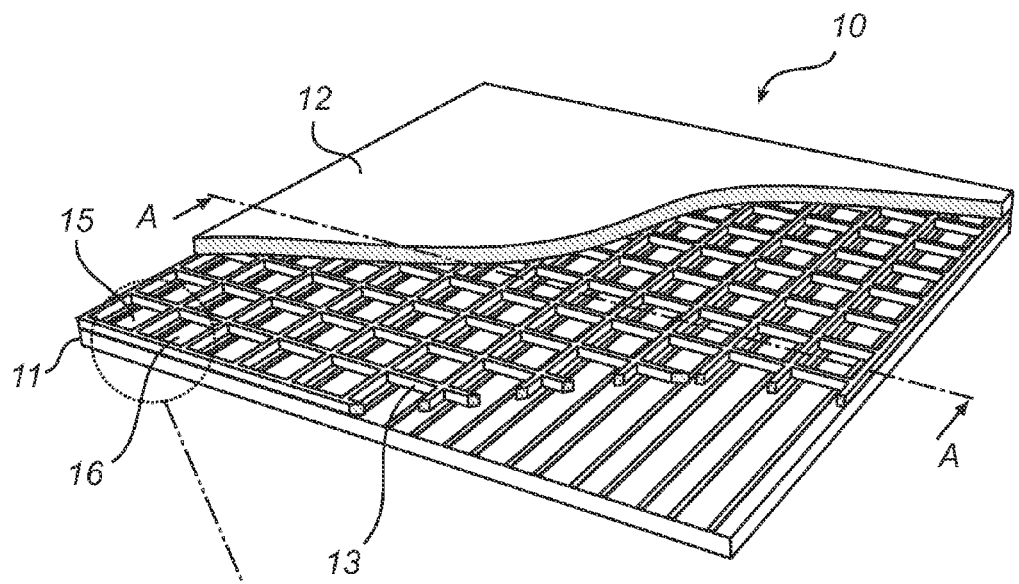
FIGS. 2*a-b* are perspective views of an exemplary appearance-modifying device according to an embodiment of the present invention.

FIG. 2a schematically illustrates an appearance-modifying device 10 comprising first 11 and second 12 oppositely arranged transparent substrates. The substrates 11, 12 are spaced apart by a spacer structure 13 in such a way that the space between the first 11 and second 12 substrates is divided into a plurality of cells 15, 16 (only two cells are indicated by reference numerals in FIG. 2a).

Figure 2B:
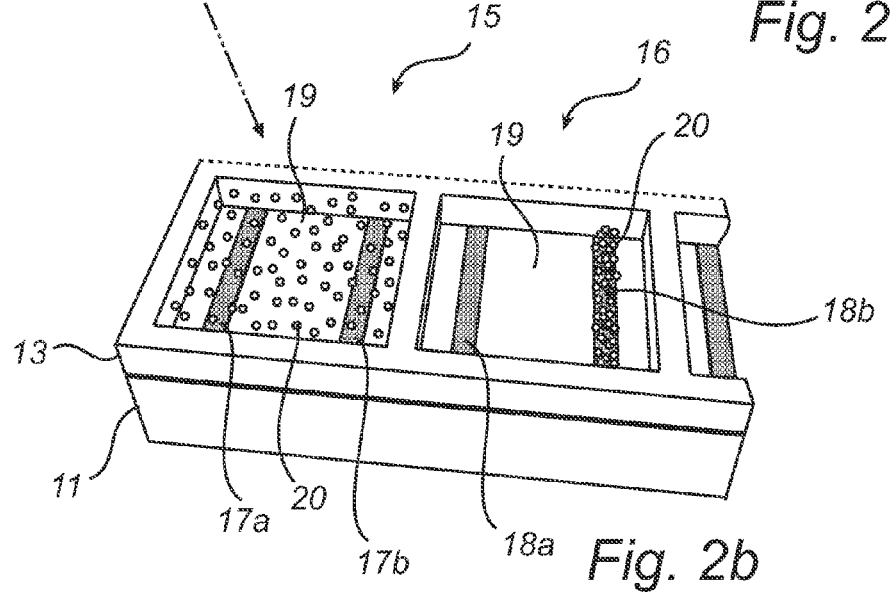

Referring to FIG. 2b, each cell 15, 16 is filled with an optically transparent fluid 19 and a plurality of particles 20 (only one representative particle is indicated in FIG. 2b). Furthermore, to control the cells 15, 16, a plurality of electrode pairs 17a-b, 18a-b (only two pairs are indicated by reference numerals in FIG. 2b) are arranged on the first substrate 11.

With continued reference to FIG. 2b, the cell 15 to the left in FIG. 2b is in a state in which the particles 20 are dispersed in the fluid 19 so that the appearance of the surface covered by the cell 15 is determined by the optical properties of the particles 20. Typically, the particles 20 are in the dispersed state shown in the left cell 15 in FIG. 2b when there is no voltage difference between the first 17a and second 17b electrodes.

Turning now to the cell 16 to the right in FIG. 2b, the particles 20 have been concentrated to the second electrode 18b through application of a suitable voltage between the first 18a and second 18b electrodes. Through the concentration of particles 20 in the cell 16 to the right, the cell 16 is switched to its transparent state and, hence, does not modify the appearance of a surface covered thereby (other than absorbing and/ or reflecting some of the light leading to a decreased brightness of the underlying surface).

The appearance-modifying device 10 in FIGS. 2a-b can be configured in various ways, some of which will be described below with reference to FIGS. 3a-d.

Figure 3A:
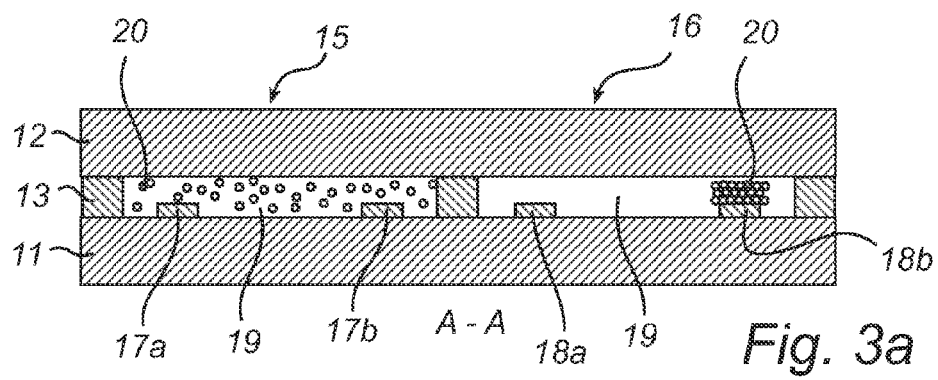
FIGS. 3*a-d* are cross-section views of the appearance-modifying device of FIG. 2 taken along the line A-A, illustrating various configurations of the appearance-modifying device.

In FIG. 3a, which is a schematic cross-section view of the appearance-modifying device 10 in FIG. 2a taken along the line A-A, a first exemplary configuration of the cells 15, 16 (the same reference numerals as for FIGS. 2a-b are used since the corresponding cells along the line A-A are controlled by the same electrode pairs and are in the same states as the cells 15, 16 of FIGS. 2a-b) are schematically illustrated.

As can be seen in FIG. 3a, the particles 20 in the cell 15 to the left are controlled to be in a state in which they are dispersed in the fluid 19, and the particles 20 in the cell 16 to the right are controlled to be in a state in which they are concentrated above one of the control electrodes 18b. The configuration of FIG. 3a corresponds to that shown in FIG. 2b.

Figure 3B:
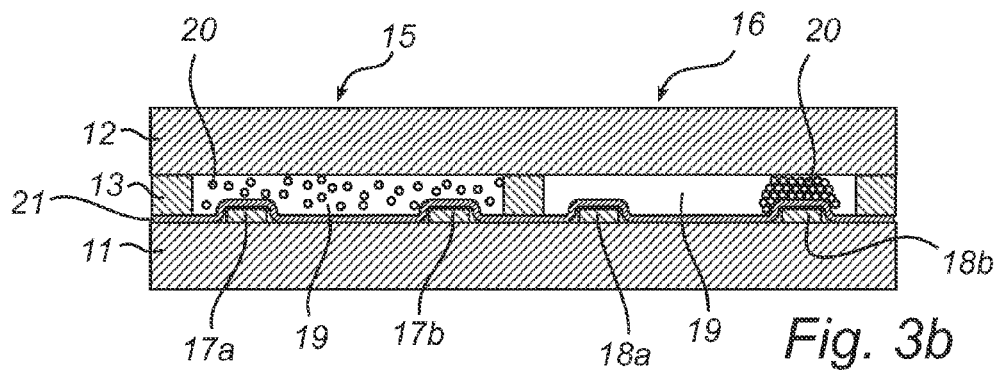

In FIG. 3b, which schematically shows a second exemplary configuration of the cells 15, 16, the first and second electrodes 17a-b, 18a-b are covered by a dielectric layer 21. Covering the first and second electrodes 17a-b, 18a-b by a dielectric layer may improve the long term reliability of the appearance-modifying device since the dielectric layer 21 passivates the electrodes such as to prevent Faradayic currents through the electrodes.

Figure 3C:
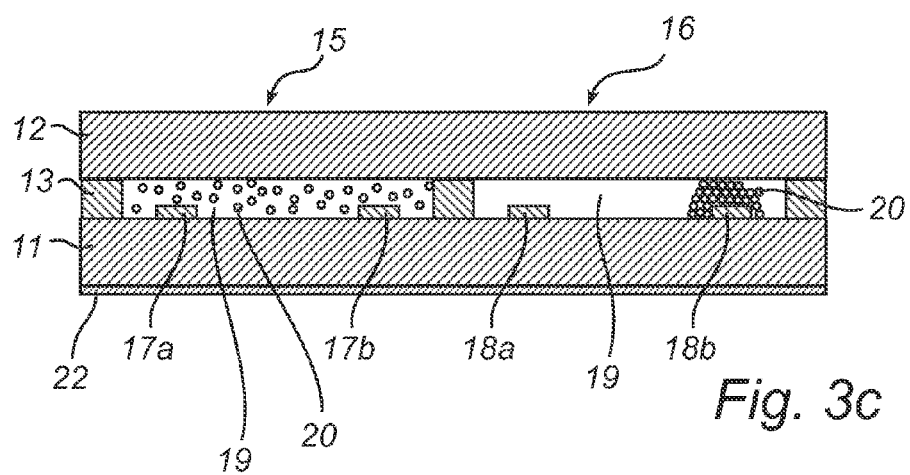

According to a third exemplary configuration, the appearance-modifying device 10 may also be provided with a color filter 22 as is schematically illustrated in FIG. 3c.

In the first three exemplary configurations shown in FIGS. 3a-c, the electrodes 17a-b, 18a-b are mainly arranged next to the spacer structure 13 and are only covered by the spacer structure 13 when passing from cell to cell as illustrated in FIG. 2a.

Figure 3D:
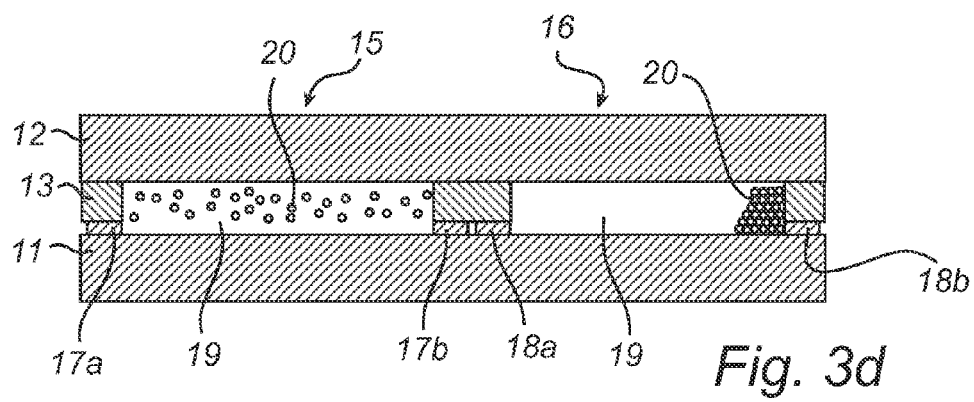

Turning now to FIG. 3d, a fourth exemplary configuration is schematically illustrated in which the first and second electrodes 17a-b, 18a-b are covered by the spacer structure 13 along a portion of the perimeter of the respective cells 15, 16. Through this configuration, the particles 20 can be concentrated closer to the cell wall, whereby the ratio between the controllable area and the total area of the cells 15, 16 can be increased compared to the configurations illustrated in FIGS. 3a-c.

With reference to FIGS. 4a-b and FIGS. 5a-b, another embodiment of the appearance-modifying device according to the present invention will now be described.

FIG. 4a is a schematic plane view of an appearance-modifying device 30 in its transparent state, and FIG. 4b is a schematic plane view of the same appearance-modifying device 30 in its appearance-modifying state.

The appearance-modifying device 30 has a plurality of hexagonal cells 31a-c (only three cells are indicated by reference numerals for the sake of clarity of drawing) separated by a spacer structure 32.

In FIGS. 5a-b, which are schematic cross-section views of one of the cells 31a in the appearance-modifying device 30, it can be seen that the first electrode is here provided in the form of a transparent electrode layer 33 covering the first substrate 11. The first electrode 33 is in turn partly covered by a dielectric layer 34, separating the spacer structure 32 from the first electrode 33. In the appearance-modifying device 30 illustrated in FIGS. 4a-b and FIGS. 5a-b, the spacer structure 32 is conductive and constitutes the second electrode. Accordingly, all of the cells 31a-c of the appearance-modifying device 30 are controlled by the same two electrodes 33 and 32. Furthermore, each cell contains a plurality of particles 20 distributed in an optically transparent fluid 19.

In analogy to the previously described configurations, the particles 20 are concentrated to the second electrode (the spacer structure) 32 when a suitable voltage is applied between the first 33 and second 32 electrodes, as is schematically illustrated in FIG. 5a, and the particles are dispersed in the cell 31a when there is no voltage present between the first 33 and second electrodes 32, as is schematically illustrated in FIG. 5b.

Figure 6:
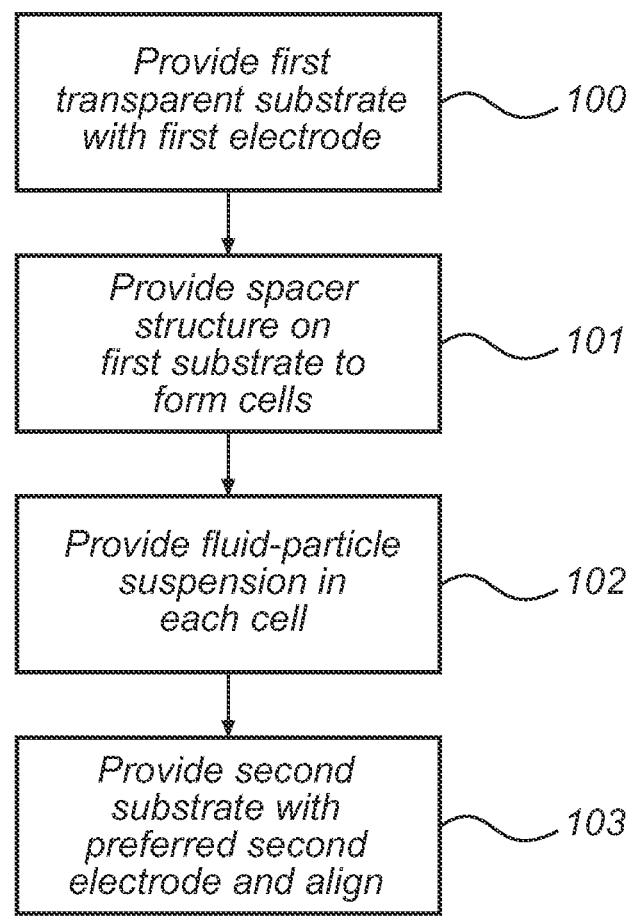
FIG. 6 is a flow-chart schematically illustrating a manufacturing method according to an embodiment of the invention.

In the following, an exemplary method of manufacturing an appearance-modifying device according to an embodiment of the present invention will be described with reference to the flow-chart in FIG. 6.

In a first step 100, a first transparent substrate with a first electrode formed thereon is provided. Subsequently, in step 101, a spacer structure is provided on the first substrate to form a plurality of cells, each including a portion of the first electrode. After having formed the cells, a fluid-particle suspension including a plurality of particles suspended in an optically transparent fluid is provided in each cell in step 102. Finally, in step 103, a second transparent substrate having a preformed second electrode is aligned to the first substrate and attached thereto to enclose the fluid-particle suspension in each cell.

The person skilled in the art will realize that the present invention is by no means limited to the preferred embodiments. For example, many other configurations of electrodes, other than those described herein, are feasible, such as the electrodes or other control means being provided on different substrates. Furthermore, additional electrodes may be provided for increased control of the appearance-modifying device, such as for achieving gray scale control.

The invention claimed is:

1. An appearance-modifying device externally covering a surface and modifying a visual appearance of said surface, said device, comprising:
   first and second oppositely arranged optically transparent substrates;
   a spacer structure spacing apart the first and second substrates, wherein a space between the first and second substrates is divided into a plurality of cells;
   in each cell an optically transparent fluid having a plurality of particles dispersed therein, the particles being moveable in the fluid through application of an electric field; and
   a first electrode and a second electrode arranged to simultaneously, by application of a voltage across the electrodes, control a selective set of said plurality of cells to provided a common distribution of the particles within said selective set of said plurality of cells from a first, dispersed state in which an appearance of the surface covered by the appearance-modifying device is determined by optical properties of the particles, to a second state in which the particles are concentrated adjacent to at least one of the first electrode and the second electrode wherein the appearance-modifying device becomes optically transparent simultaneously in the selective set of said plurality of cells to allow light to pass therethrough making the surface covered by the appearance modifying device-visible to the user.

2. The appearance-modifying device according to claim 1, configured in such a way that, for each cell, a ratio between an area controllable by the first and second electrodes between a particle-modified state and a transparent state, and the total area of the cell is greater than 70%.

3. The appearance-modifying device according to claim 2, wherein the total area of each cell is greater than 0.01 mm$^2$.

4. The appearance-modifying device according to claim 1, wherein the first and second electrodes are arranged to simultaneously control at least 100 cells.

5. The appearance-modifying device according to claim 1, wherein at least one of the first and second electrodes is at least partly covered by the spacer structure along a portion of a perimeter of each of the cells controllable by the electrodes.

6. The appearance-modifying device according to claim 1, wherein at least a portion of the spacer structure is conductive and forms the second electrode.

7. The appearance-modifying device according to claim 1, wherein the first and second electrodes are arranged on the first substrate.

8. The appearance-modifying device according to claim 1, wherein the first electrode is arranged on the first substrate, and the second electrode is arranged on the second substrate.

9. The appearance-modifying device according to claim 1, wherein the first electrode is provided as a transparent conductive layer formed on the first substrate and covered by a dielectric layer.

10. The appearance-modifying device according to claim 9, wherein the dielectric layer has a recess formed therein in each cell.

11. The appearance-modifying device according to claim 10, wherein the recess is essentially centrally located in the cell.

12. The appearance-modifying device according to claim 10, wherein the dielectric layer has a plurality of recesses formed therein in each cell to expose a plurality of portions of the first electrode.

13. A method for manufacturing an appearance-modifying device said appearance modifying device externally covering and modifying a visual appearance of a surface, the method comprising the steps of:
   providing a first optically transparent substrate having a first electrode formed thereon;
   providing a spacer structure to form a plurality of cells on the first substrate, wherein an area occupied by each cell includes a portion of the first electrode;
   arranging a second electrode wherein the area occupied by each cell includes a portion of the second electrode;
   providing, in each of the cells an optically transparent fluid having a plurality of particles dispersed therein; and
   arranging a second optically transparent substrate to cover the cells the first electrode and the second electrode arranged to control a selective set of said plurality of cells to provide a common distribution of the particles within said selective set of said plurality of cells.

14. The method according to claim 13, wherein the second electrode is provided on the second optically transparent substrate and the step of arranging the second substrate comprises the step of aligning the second electrode to the plurality of cells.

15. The method according to claim 13, wherein the first electrode is covered by a dielectric layer, the method further comprising the step of:
   removing, in an area corresponding to each cell, a portion of the dielectric layer to form a recess therein.

* * * * *